(12) United States Patent
Zhang et al.

(10) Patent No.: US 10,745,770 B2
(45) Date of Patent: Aug. 18, 2020

(54) METHOD OF SIMULTANEOUSLY RECYCLING PLASTICS AND DETOXIFYING CHROMITE ORE PROCESSING RESIDUE BY RESIDUAL HEAT FROM STEEL SLAG

(71) Applicant: QINGDAO TECHNOLOGICAL UNIVERSITY, Qingdao, Shandong (CN)

(72) Inventors: Dalei Zhang, Shandong (CN); Shenqian Deng, Shandong (CN); Jian Li, Shandong (CN); Ruidong Li, Shandong (CN); Yuanfeng Qi, Shandong (CN)

(73) Assignee: QINGDAO TECHNOLOGICAL UNIVERSITY, Qingdao (CN)

( * ) Notice: Subject to any disclaimer, the term of this patent is extended or adjusted under 35 U.S.C. 154(b) by 188 days.

(21) Appl. No.: 16/028,319

(22) Filed: Jul. 5, 2018

(65) Prior Publication Data
US 2018/0312933 A1    Nov. 1, 2018

Related U.S. Application Data

(63) Continuation of application No. PCT/CN2017/071517, filed on Jan. 18, 2017.

(30) Foreign Application Priority Data

Jan. 19, 2016 (CN) .......................... 2016 1 0033731

(51) Int. Cl.
*C21B 3/08* (2006.01)
*C10B 53/07* (2006.01)
(Continued)

(52) U.S. Cl.
CPC .................. *C21B 3/08* (2013.01); *B09B 3/00* (2013.01); *B09B 3/0083* (2013.01);
(Continued)

(58) Field of Classification Search
CPC .............................. C21B 3/08; C21B 2400/02
(Continued)

(56) References Cited

U.S. PATENT DOCUMENTS 3,753,683 A    8/1973    Vlnaty

FOREIGN PATENT DOCUMENTS

CN         1124295 A      6/1996
CN       101113341 A      1/2008
(Continued)

*Primary Examiner* — Weiping Zhu
(74) *Attorney, Agent, or Firm* — Wayne & Ken, LLC; Tony Hom

(57) ABSTRACT

The present invention provides a method of simultaneously recycling plastics and detoxifying chromite ore processing residue with residual heat from a steel slag. By heating and gasifying plastics with steel slag, followed by catalytically split-decomposing the plastics with catalysts such as chromite ore processing residue, the plastics are thoroughly converted into a energy gas under water vapor gasification. The surface coking of Chromite Ore Processing Residue is avoided. Meanwhile, the energy gas reduces $Cr^{6+}$ in Chromite Ore Processing Residue into $Cr^{3+}$, and the energy gas is cooled, and $CO_2$ and Cl in the energy gas are adsorbed by alkaline substances in Chromite Ore Processing Residue. With this method, chromite ore processing residue is detoxified, and steel slag is cooled, furthermore, energy is saved and a energy gas is obtained.

6 Claims, 2 Drawing Sheets

(51) Int. Cl.
*B09B 3/00* (2006.01)
*C10K 3/02* (2006.01)
*C10B 49/14* (2006.01)
*C10K 3/04* (2006.01)
*B09B 5/00* (2006.01)
*C10B 57/00* (2006.01)

(52) U.S. Cl.
CPC .............. *B09B 3/0091* (2013.01); *B09B 5/00* (2013.01); *C10B 49/14* (2013.01); *C10B 53/07* (2013.01); *C10B 57/005* (2013.01); *C10K 3/02* (2013.01); *C10K 3/04* (2013.01); *C21B 2200/00* (2013.01); *C21B 2300/02* (2013.01); *C21B 2400/02* (2018.08); *C21B 2400/024* (2018.08); *C21B 2400/026* (2018.08); *C21B 2400/06* (2018.08); *C21B 2400/072* (2018.08); *C21C 2200/00* (2013.01); *Y02P 20/129* (2015.11); *Y02P 20/143* (2015.11)

(58) Field of Classification Search
USPC .......................................................... 75/414
See application file for complete search history.

(56) References Cited

FOREIGN PATENT DOCUMENTS

| | | |
|---|---|---|
| CN | 102517062 A | 6/2012 |
| CN | 103396823 A | 11/2013 |
| CN | 103978007 A | 8/2014 |
| CN | 105062524 A | 11/2015 |
| CN | 105524635 A | 4/2016 |
| JP | 2000343058 A | 12/2000 |

METHOD OF SIMULTANEOUSLY RECYCLING PLASTICS AND DETOXIFYING CHROMITE ORE PROCESSING RESIDUE BY RESIDUAL HEAT FROM STEEL SLAG

The present application claims priority to Chinese Patent Application No. CN201610033731.5 filed to the China Patent Bureau on Jan. 19, 2016 and entitled "method of simultaneously recycling plastics and detoxifying chromite ore processing residue by residual heat from steel slag", the disclosure of which is hereby incorporated by reference in its entirety.

TECHNICAL FIELD

The present invention belongs to a technical field of environment protection and low-carbon treatment, and in particularly, belongs to a method of method of simultaneously recycling plastics and detoxifying chromite ore processing residue by residual heat from steel slag.

BACKGROUND OF THE PRESENT INVENTION

Chromite ore processing residue is a by-product discharged during the production of dichromate. Chromite Ore Processing Residue contains water-soluble $Cr^{6+}$ and is thus extremely toxic. If Chromite Ore Processing Residue is stacked in the open air without treatment, underground water sources, rivers or seas will be polluted to different degrees. As a result, the human health and the growth of plants and animals will be endangered seriously.

Generally, as the existing methods for detoxifying Chromite Ore Processing Residue (i.e., converting highly toxic $Cr^{6+}$ into $Cr^{3+}$), there are two categories, i.e., wet detoxification and dry detoxification. However, both the wet detoxification and the dry detoxification have their own problems. The wet detoxification is a method for reducing, in purpose of detoxification, $Cr^{6+}$ in Chromite Ore Processing Residue in a liquid phase by adding a reductant. However, this method has high reagent consumption and high cost, and is still difficult to treat Chromite Ore Processing Residue on a large scale at present. In the dry detoxification, the purpose of detoxification is achieved by reducing $Cr^{6+}$ in Chromite Ore Processing Residue into $Cr^{3+}$ by strong reduction in a high-temperature reductive atmosphere. The conventional dry detoxification is to reduce toxic $Cr^{6+}$ into nontoxic $Cr^{6+}$ by heating it to about 1000° C. in a reductive atmosphere by using carbon as a reductant. This method has been widely applied to the treatment of Chromite Ore Processing Residue and has certain economic benefits. However, the method is accompanied with secondary dust pollution during the treatment, and has high investment cost and high energy consumption.

Plastic is a white pollutant. At present, there are various problems in the methods for treating plastics. Due to the presence of Cl in the plastics, it is likely to generate dioxin if the plastics are burnt. As a more practical method currently, the plastics are pyrolyzed to produce fuel oil and gas. Chinese Patent Application No. CN201110366027.9 disclosed a method for preparing fuel oil and gas from plastics in two steps, wherein, in the first step, HCl is volatilized at a low temperature, and in the second step, the plastics are pyrolyzed to produce oil and gas. Although this method is practical, the reaction period is long due to the implementation in two steps. In addition, during the implementation of the process, it is difficult to completely volatilize HCl, and part of the residual HCl easily enters the pyrolysis oil and gas in the second step so as to contaminate the pyrolysis oil and gas.

Additionally, a large amount of steel slag will be produced in China every year, and the liquid steel slag has a high temperature of about 1500° C. to 1700° C. The steel slag will become valuable resources if it is utilized fully. However, at present, there are few processes by which heat of steel slag can be effectively utilized.

SUMMARY OF THE PRESENT INVENTION

In view of the deficiencies of the prior art, the present invention provides a method of simultaneously recycling plastics and detoxifying chromite ore processing residue by residual heat from steel slag. By process control, the liquid steel slag can be cooled effectively and the heat from the liquid steel slag can be utilized effectively. Meanwhile, the plastics are converted into a high-quality energy gas, and $Cr^{6+}$ in chromite ore processing residue is reduced efficiently.

This process employs the following technical solutions. By heating and gasifying plastics with liquid steel slag to obtain a plastic pyrolysis gas, gasifying cooling water to obtain water vapor, and catalytically cracking the plastic pyrolysis gas at a high temperature by using hazardous waste chromite ore processing residue, the plastic pyrolysis gas is thoroughly converted into a low-molecular energy gas ($H_2$, CO, $CH_4$ and Cl, $CO_2$, etc.) by gasification of water vapor, so that the surface coking of Chromite Ore Processing Residue is avoided. Meanwhile, the energy gas generated from the plastics heats Chromite Ore Processing Residue and reduces $Cr^{6+}$ in Chromite Ore Processing Residue into $Cr^{3+}$; and, the energy gas is cooled by Chromite Ore Processing Residue incidentally, and $CO_2$ and Cl in the energy gas are absorbed by alkaline substances in Chromite Ore Processing Residue. In this process, in addition to the detoxification of Chromite Ore Processing Residue, energy is saved and a energy gas is obtained.

The method of the present invention may include the following steps of:

(1) pouring liquid steel slag at 1500° C. to 1700° C. (e.g., 1500° C., 1600° C., 1700° C., etc.) from a slag ladle into an inlet end of a wheeled feeder, preliminary crushing the liquid steel slag, feeding the steel slag from an outlet end of the wheeled feeder to an inlet of a roller crusher, mixing the liquid steel slag with plastics, pyrolyzing the plastics to obtain a plastic pyrolysis gas and plastic pyrolysis coke, conveying the steel slag and the plastic pyrolysis coke to an outlet end of the roller crusher, cooling the steel slag by cooling water, and then discharging the steel slag, wherein the mass ratio of the cooling water for cooling the steel slag to the continuously fed steel slag is 1:(1-8) (e.g., 1:1, 1:2, 1:4, 1:8, etc.), and the mass ratio of the plastics to the continuously fed steel slag is 1:(1-8) (e.g., 1:1, 1:2, 1:4, 1:8, etc.), wherein the mass ratio of the cooling water for cooling the steel slag to the continuously fed plastics is controlled at (0.2-5):1 (e.g., 0.2:1, 1:1, 3:1, 5:1, etc.);

(2) spraying the cooling water from step (1) from the outlet end of the roller crusher onto the surface of the steel slag where the cooling water becomes water vapor; then controlling the water vapor to flow in a direction opposite to the steel slag to exchange heat with the steel slag, conveying the water vapor to the inlet end of the roller crusher, and mixing the water vapor with the plastic pyrolysis gas; conveying the mixed gas to the wheeled feeder to exchange heat with the high-temperature steel slag to obtain a high-temperature mixed gas at 1000° C. to 1400° C. (e.g., 1000° C., 1200° C., 1400° C., etc.);

(3) conveying the high-temperature mixed gas from step (2) to a catalytic reforming furnace, loading calcined chromite ore processing residue in the furnace, heating Chromite Ore Processing Residue by the high-temperature mixed gas, and catalytically reforming Chromite Ore Processing Residue at 800° C. to 1200° C. (e.g., 800° C., 1000° C., 1200° C., etc.) to generate a high-temperature energy gas;

(4) conveying the high-temperature energy gas from step (3) to a head of an internally-heated rotary kiln to exchange heat with Chromite Ore Processing Residue continuously conveyed from a tail of the rotary kiln, and reducing $Cr^{6+}$ in Chromite Ore Processing Residue into $Cr^{3+}$ by the energy gas; after the temperature of the energy gas is below 250° C., discharging the energy gas from the tail of the rotary kiln to a condensation device, controlling the energy gas to flow in a direction opposite to the cooling water to realize indirect heat exchange, condensing, dehydrating and gathering the energy gas, wherein the mass ratio of the continuously generated high-temperature energy gas to the continuously fed chromite ore processing residue is controlled at (1-8):4 (e.g., 1:4, 1:2, 1:1, 2:1, etc.); and (5) discharging the heat-exchanged high-temperature chromite ore processing residue from step (4) from the head of the rotary kiln into a cooling device, cooling the high-temperature chromite ore processing residue to below 150° C. by the cooling water and discharging the cooled chromite ore processing residue, and controlling the gas pressure inside the cooling device to be 0 to 30 kp higher than atmosphere by the generated water vapor.

The method of the present invention may further include the following steps.

A method of simultaneously recycling plastics and detoxifying chromite ore processing residue by residual heat from steel slag is provided, including the following steps of:

(1) pouring liquid steel slag within a preset temperature range from a slag ladle into an inlet end of a wheeled feeder, preliminary crushing the steel slag, feeding the steel slag from an outlet end of the wheeled feeder to an inlet of a roller crusher, mixing the liquid steel slag with plastics, pyrolyzing the plastics to obtain a plastic pyrolysis gas and plastic pyrolysis coke, conveying the steel slag and the plastic pyrolysis coke to an outlet end of the roller crusher, cooling the steel slag by cooling water, and discharging the steel slag;

(2) spraying the cooling water from step (1) from the outlet end of the roller crusher onto the surface of the steel slag where the cooling water becomes water vapor; then, controlling the water vapor to flow in a direction opposite to the steel slag to exchange heat with the steel slag, conveying the water vapor to the inlet end of the roller crusher, and mixing the water vapor with the plastic pyrolysis gas; conveying the mixed gas to the wheeled feeder to exchange heat with the high-temperature steel slag to obtain a high-temperature mixed gas;

(3) conveying the high-temperature mixed gas from step (2) to a catalytic reforming furnace, loading calcined chromite ore processing residue in the furnace, heating Chromite Ore Processing Residue by the mixed gas, and catalytically reforming Chromite Ore Processing Residue with a set temperature range to generate a high-temperature energy gas;

(4) conveying the high-temperature energy gas generated from step (3) to a head of an internally-heated rotary kiln to exchange heat with Chromite Ore Processing Residue continuously conveyed from a tail of the rotary kiln, and reducing $Cr^{6+}$ in Chromite Ore Processing Residue into $Cr^{3+}$ by the energy gas; after the temperature of the energy gas is lowered to below a first set temperature, discharging the energy gas from the tail of the rotary kiln to a condensation device, controlling the energy gas to flow in a direction opposite to the cooling water to realize indirect heat exchange, condensing, dehydrating and gathering the energy gas; and (5) discharging the heat-exchanged chromite ore processing residue from step (4) from the head of the rotary kiln into a cooling device, cooling Chromite Ore Processing Residue to below a second set temperature by the cooling water and discharging the cooled chromite ore processing residue, and controlling the gas pressure inside the cooling device to be higher than the gas pressure outside the cooling device by the generated water vapor.

Optionally, the preset temperature range is 1500° C. to 1700° C.

After the mixed gas is conveyed to the wheeled feeder to exchange heat with the steel slag, the temperature of the converted mixed gas is 1000° C. to 1400° C.

The set temperature range is 800° C. to 1200° C.

The first set temperature is 250° C.

The second set temperature is 150° C.

The step of controlling the gas pressure inside the cooling device to be higher than the gas pressure outside the cooling device by the generated water vapor includes:

controlling the gas pressure in the cooling device to be 0 kp to 30 kp higher than the atmosphere by the generated water vapor.

The mass ratio of the cooling water for cooling the steel slag to the continuously fed steel slag is 1:(1-8).

The mass ratio of the plastics to the continuously fed steel slag is 1:(1-8).

The mass ratio of the continuously generated high-temperature energy gas to the continuously fed chromite ore processing residue is controlled at (1-8):4.

The mass ratio of the cooling water for cooling the steel slag to the continuously fed plastics is controlled at (0.2-5):1.

Chromite Ore Processing Residue loaded in the catalytic reforming furnace can be replaced with dolomite or $Al_2O_3$-based nano-catalyst.

Compared with the conventional plastic treatment methods, the method has the following advantages:

1. Plastics and cooling water are heated and gasified by the high-temperature liquid steel slag and a plastic pyrolysis product and a water vapor are generated. providing a condition for catalytic preparation of a energy gas from the pyrolysis product. By fully utilizing the heat, the energy efficiency is improved greatly.

2. The plastics is catalyzed by Chromite Ore Processing Residue, and the use of expensive catalysts is avoided. The detoxification of Chromite Ore Processing Residue is realized.

3. Due to the high-temperature water vapor, coke deposit on the surface of Chromite Ore Processing Residue is greatly decreased after $Cr^{6+}$ is reduced, enabling secondary utilization of the treated chromite ore processing residue;

4. Chromite Ore Processing Residue is heated and detoxified by the energy gas generated by catalytic reforming. Additional devices for cooling the high-temperature energy gas are saved;

5. The water vapor generated in each stage of the process is fully utilized, and no additional heat source is required to facilitate the generation of water vapor, saving enormous amount of energy. The discharge of the water vapor is reduced, and a secondary pollution is avoided;

6. The by-products such as $CO_2$ in the energy gas generated by the catalytic pyrolysis of the plastics can be absorbed by alkaline substances such as CaO in Chromite Ore Processing Residue, so that the quality of the fuel product is improved.

7. Chromite Ore Processing Residue is cooled in Chromite Ore Processing Residue cooling device by the cooling water, and the water vapor is generated. The gas pressure in the device is increased, and outside air is prevented from entering the system to oxidize the reduced $Cr^{3+}$, so no additional device is required to control the gas pressure.

DETAILED DESCRIPTION OF THE PRESENT INVENTION

Figure 1:
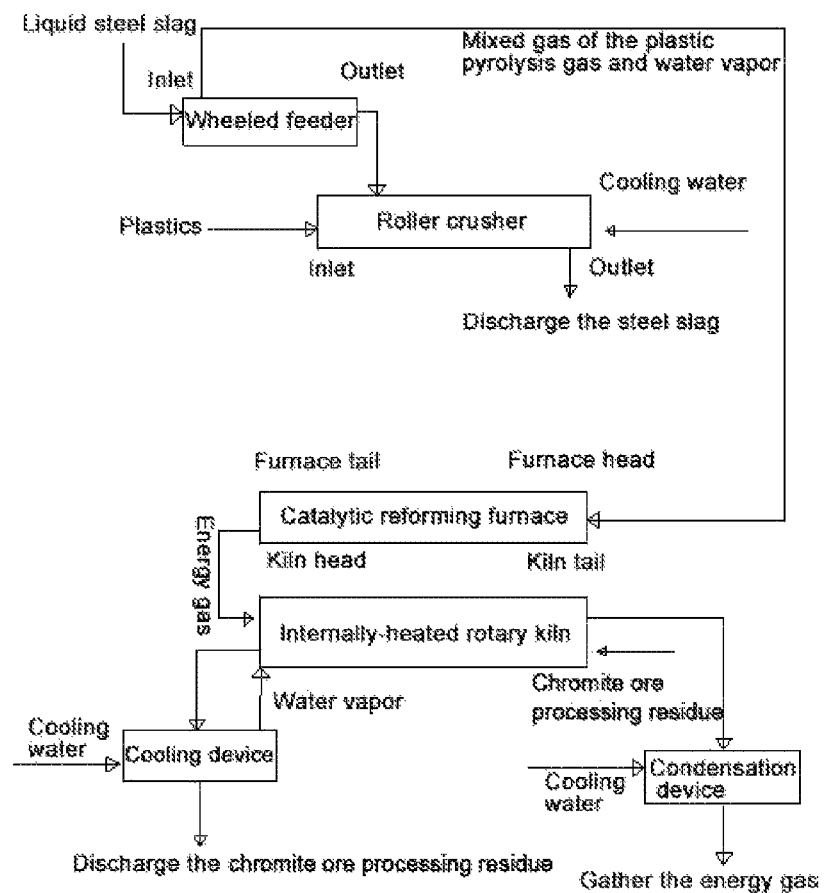
FIG. 1 is a process flowchart.
Figure 2:
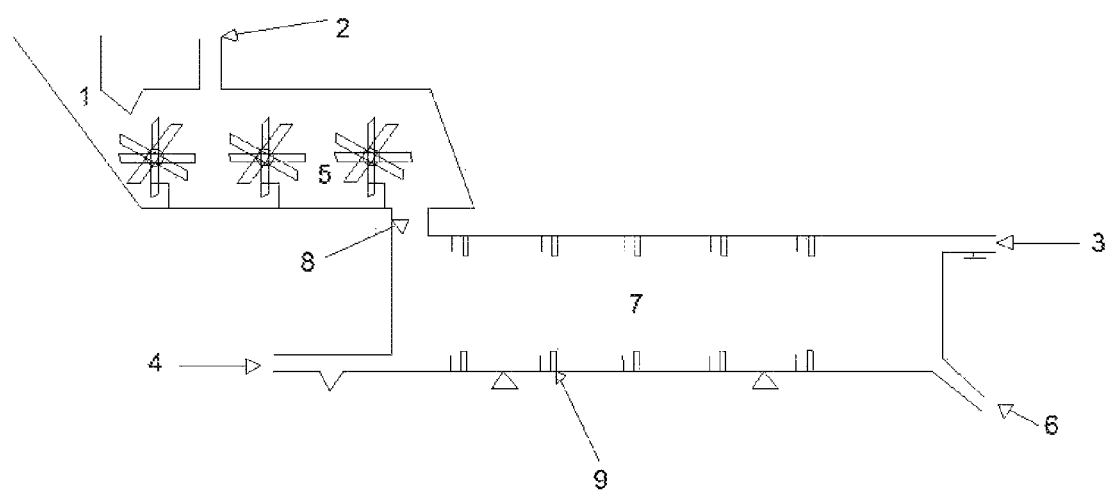
FIG. 2 is a schematic structure diagram of a liquid steel slag feeder and a crusher, in which:
1: liquid chromite ore processing residue inlet; 2: mixed gas outlet; 3: cooling water inlet; 4: plastics inlet; 5: wheeled feeder; 6: steel slag outlet; 7: roller crusher; 8: connection port of the wheeled feeder with the roller crusher; and, 9: gear.

Embodiments of the present invention provide a synchronous method for recycling plastics and detoxifying chromite ore processing residue by residual heat from steel slag, including the following steps of:

(1) pouring liquid steel slag within a preset temperature range from a slag ladle into an inlet end of a wheeled feeder, performing quantitative feeding and preliminary crushing, feeding the steel slag from an outlet end of the wheeled feeder to an inlet of a roller crusher, mixing the liquid steel slag with plastics, pyrolyzing the plastics to obtain a plastic pyrolysis gas and plastic pyrolysis coke, conveying the steel slag and the plastic pyrolysis coke to an outlet end of the roller crusher, cooling by cooling water, and discharging;

(2) spraying the cooling water from step (1) from the outlet end of the roller crusher onto the surface of the steel slag where the cooling water becomes water vapor; then, controlling the water vapor to flow in a direction opposite to the steel slag to exchange heat with the steel slag, conveying the water vapor to the inlet end of the roller crusher, and mixing the water vapor with the plastic pyrolysis gas; conveying the mixed gas to the wheeled feeder to exchange heat with the high-temperature steel slag to obtain a high-temperature mixed gas;

(3) conveying the high-temperature mixed gas from step (2) to a catalytic reforming furnace, loading calcined chromite ore processing residue in the furnace, heating Chromite Ore Processing Residue by the high-temperature mixed gas, and catalytically reforming Chromite Ore Processing Residue with a set temperature range to generate a high-temperature energy gas;

(4) conveying the high-temperature energy gas generated from step (3) to a head of an internally-heated rotary kiln to exchange heat with Chromite Ore Processing Residue continuously conveyed from a tail of the rotary kiln, and reducing $Cr^{6+}$ in Chromite Ore Processing Residue into $Cr^{3+}$ by the high-temperature energy gas; after the temperature of the high-temperature energy gas is lowered to below a first set temperature, discharging the high-temperature energy gas from the tail of the rotary kiln to a condensation device, controlling the high-temperature energy gas to flow in a direction opposite to the cooling water to realize indirect heat exchange, condensing, dehydrating and gathering the energy gas; and (5) discharging the heat-exchanged high-temperature chromite ore processing residue from step (4) from the head of the rotary kiln into a cooling device, cooling the high-temperature chromite ore processing residue to below a second set temperature by the cooling water and discharging the cooled chromite ore processing residue, and controlling the gas pressure inside the cooling device to be higher than the gas pressure outside the cooling device by the generated water vapor.

The preset temperature range may be selected flexibly as long as the plastics can be gasified and toxic $Cr^{6+}$ can be reduced into nontoxic $Cr^{3+}$. In order to ensure the reliability of the gasification of the plastics and the reduction of the toxic chromium, the preset temperature range needs to be greater than 1000° C. For example, the preset temperature range may be greater than 1400° C. For another example, the preset temperature range may be 1500° C. to 1700° C., for example, 1500° C., 1600° C., 1700° C., etc.

According to different preset temperature ranges, the temperature of the converted high-temperature mixed gas is different after the mixed gas is conveyed to the wheeled feeder to exchange heat with the high-temperature steel slag. For example, if the preset temperature range is 1500° C. to 1700° C., the temperature of the converted high-temperature mixed gas is 1000° C. to 1400° C., for example, 1000° C., 1200° C., 1400° C., etc. For another example, if the preset temperature range is greater than 1400° C., the temperature of the converted high-temperature mixed gas is approximately greater than 1000° C.

The set temperature range is varied as long as Chromite Ore Processing Residue can be catalytically reformed. For example, the set temperature range may be 800° C. to 1200° C., for example, 800° C., 1000° C., 1200° C., etc. It should be understood that the set temperature range may also be a certain value around the range from 800° C. to 1200° C.

The first set temperature may have various values as long as the gas at the first set temperature can be condensed by the condensation device. In this embodiment, the first set temperature may be 250° C. It should be understood that the first set temperature may be different according to different performance of the condensation device. Correspondingly, the second set temperature may have various values as long as the gas at the second set temperature can be cooled by the cooling device. In this embodiment, the second set temperature may be 150° C. It should be understood that the second set temperature may be different according to different performance of the cooling device.

Optionally, in this embodiment, the step of controlling the gas pressure inside the cooling device to be higher than the gas pressure outside the cooling device by the generated water vapor includes: controlling the gas pressure inside the cooling device to be 0 kp to 30 kp higher than the gas pressure outside the cooling device by the generated water vapor.

The mass ratio of the cooling water for cooling the steel slag to the continuously fed steel slag may have various values. For example, the mass ratio may be 1:(1-8), for example, 1:1, 1:2, 1:4, 1:8, etc.

The mass ratio of the plastics to the continuously fed steel slag may have various values. For example, the mass ratio may be 1:(1-8), for example, 1:1, 1:2, 1:4, 1:8, etc.

The mass ratio of the continuously generated high-temperature energy gas to the continuously fed chromite ore processing residue is controlled at (1-8):4, for example, 1:4, 1:2, 1:1, 2:1, etc.

The mass ratio of the cooling water for cooling the steel slag to the continuously fed plastics is controlled at (0.2-5):1, for example, 0.2:1, 1:1, 3:1, 5:1, etc.

Chromite Ore Processing Residue loaded in the catalytic reforming furnace can be replaced with dolomite or $Al_2O_3$-based nano-catalyst.

Hereinafter, the reliability of the solutions provided in the embodiments of the present invention will be verified under different conditions in the embodiments of the present invention.

Embodiment 1

(1) The liquid steel slag at 1500° C. was poured from a slag ladle into an inlet end of a wheeled feeder, then fed quantitatively and preliminarily crushed, fed from an outlet end of the wheeled feeder to an inlet of a roller crusher, and mixed with plastics. The plastics were pyrolyzed to obtain a plastic pyrolysis gas and plastic pyrolysis coke; and subsequently, the steel slag and the plastic pyrolysis coke were conveyed to an outlet end of the roller crusher, cooled by cooling water and discharged. The mass ratio of the cooling water for cooling the steel slag to the continuously fed steel slag was 1:2, and the mass ratio of the plastics and the continuously fed steel slag was 1:2.

(2) The cooling water from step (1) was sprayed from the outlet end of the roller crusher onto the surface of the steel slag to generate water vapor; subsequently, the water vapor was controlled to flow in a direction opposite to the steel slag to exchange heat with the steel slag, and was then conveyed to the inlet end of the roller crusher to mix with the plastic pyrolysis gas; and, the mixed gas was conveyed to the wheeled feeder to exchange heat with the high-temperature steel slag to obtain a high-temperature mixed gas at 1000° C.

(3) The high-temperature mixed gas from step (2) was conveyed to a catalytic reforming furnace, calcined chromite ore processing residue was loaded in the furnace, Chromite Ore Processing Residue was heated by the high-temperature mixed gas to catalytically reform Chromite Ore Processing Residue at 800° C. so as to generate a high-temperature energy gas.

(4) The high-temperature energy gas generated from step (3) was fed to a head of an internally-heated rotary kiln to exchange heat with Chromite Ore Processing Residue continuously conveyed from a tail of the rotary kiln, and the high-temperature energy gas reduced $Cr^{6+}$ in Chromite Ore Processing Residue into $Cr^{3+}$; after the temperature of the high-temperature energy gas was lowered to below 250° C., the high-temperature energy gas was discharged from the tail of the rotary kiln to a condensation device; and the high-temperature energy gas was controlled to flow in a direction opposite to the cooling water to realize indirect heat exchange, condensed, dehydrated and gathered. The mass ratio of the continuously generated high-temperature energy gas to the continuously fed chromite ore processing residue was controlled at 2:1.

(5) The heat-exchanged high-temperature chromite ore processing residue from step (4) was discharged from the head of the rotary kiln to a cooling device, the high-temperature chromite ore processing residue was cooled to below 150° C. by the cooling water and then discharged, and the gas pressure inside the cooling device was controlled to be 10 kp higher than the gas pressure outside the cooling device by the generated water vapor.

(6) A toxicity leaching test was conducted on the treated chromite ore processing residue by a horizontal vibration method in accordance with the international standard GB5086.2. The measured content of the water-soluble chromium was 0.01 mg/L, which was far lower than the upper limit (1.5 mg/L) of hazardous waste specified in the national standard GB5085.3; and, 0.65 t of energy gas was generated per ton of plastics, and the content of flammable gas was higher than 80%.

Embodiment 2

(1) The liquid steel slag at 1600° C. was poured from a slag ladle into an inlet end of a wheeled feeder, then fed quantitatively and preliminarily crushed, fed from an outlet end of the wheeled feeder to an inlet of a roller crusher, and mixed with plastics. The plastics were pyrolyzed to obtain a plastic pyrolysis gas and plastic pyrolysis coke; and subsequently, the steel slag and the plastic pyrolysis coke were conveyed to an outlet end of the roller crusher, cooled by cooling water and discharged. The mass ratio of the cooling water for cooling the steel slag to the continuously fed steel slag was 1:4, and the mass ratio of the plastics and the continuously fed steel slag was 1:2.

(2) The cooling water from step (1) was sprayed from the outlet end of the roller crusher onto the surface of the steel slag to generate water vapor; subsequently, the water vapor was controlled to flow in a direction opposite to the steel slag to exchange heat with the steel slag, and was then conveyed to the inlet end of the roller crusher to mix with the plastic pyrolysis gas; and, the mixed gas was conveyed to the wheeled feeder to exchange heat with the high-temperature steel slag and then converted into high-temperature mixed gas at 1400° C.

(3) The high-temperature mixed gas from step (2) was conveyed to a catalytic reforming furnace, calcined chromite ore processing residue was loaded in the furnace, Chromite Ore Processing Residue was heated by the high-temperature mixed gas to catalytically reform Chromite Ore Processing Residue at 800° C. so as to generate a high-temperature energy gas.

(4) The high-temperature energy gas generated from step (3) was fed to a head of an internally-heated rotary kiln to exchange heat with Chromite Ore Processing Residue continuously conveyed from a tail of the rotary kiln, and the high-temperature energy gas reduced $Cr^{6+}$ in Chromite Ore Processing Residue into $Cr^{3+}$; after the temperature of the high-temperature energy gas was lowered to below 250° C., the high-temperature energy gas was discharged from the tail of the rotary kiln to a condensation device; and the high-temperature energy gas was controlled to flow in a direction opposite to the cooling water to realize indirect heat exchange, condensed, dehydrated and gathered. The mass ratio of the continuously generated high-temperature energy gas to the continuously fed chromite ore processing residue was controlled at 1:1.

(5) The heat-exchanged high-temperature chromite ore processing residue from step (4) was discharged from the head of the rotary kiln to a cooling device, the high-temperature chromite ore processing residue was cooled to below 150° C. by the cooling water and then discharged, and the gas pressure inside the cooling device was controlled to be 25 higher than the gas pressure outside the cooling device by the generated water vapor.

(6) A toxicity leaching test was conducted on the treated chromite ore processing residue by a horizontal vibration method in accordance with the international standard GB5086.2. The measured content of the water-soluble chromium was 0.01 mg/L, which was far lower than the upper limit (1.5 mg/L) of the hazardous waste specified in the national standard GB5085.3; and, 0.7 t of energy gas was generated per ton of plastics, and the content of flammable gas was higher than 80%.

In the embodiments of the present invention, Chromite Ore Processing Residue loaded in the catalytic reforming furnace can be replaced with dolomite or $Al_2O_3$-based nano-catalyst.

Based on embodiments 1 and 2, the temperature of the liquid steel slag poured from the slag ladle into the inlet end of the wheeled feeder may be selected flexibly, as long as the plastics can be gasified and toxic $Cr^{6+}$ can be reduced into nontoxic $Cr^{3+}$. For example, the temperature of the liquid steel slag may be greater than 1400° C. For another example, the temperature of the liquid steel slag may be 1500° C. to 1700° C., for example, 1550° C., 1650° C., 1680° C., etc. The temperature of the converted high-temperature mixed gas may be 1000° C. to 1400° C., for example, 1100° C., 1210° C., 1310° C., 1410° C., etc. The temperature range for heating Chromite Ore Processing Residue by the high-temperature mixed gas and catalytically reforming Chromite Ore Processing Residue to generate the high-temperature energy gas may be varied. For example, the temperature range may be 800° C. to 1200° C., for example, 810° C., 1100° C., 1190° C., etc. It should be understood that the temperature range may also be a certain value around the range from 800° C. to 1200° C. The temperature of the gas entering the condensation device may be varied. The temperature of the gas may be different according to different performance of the condensation device. The temperature of the gas entering the cooling device may be varied. The temperature of the gas may be different according to different performance of the cooling device. The value of the gas pressure inside the cooling device higher than the gas pressure outside the cooling device controlled by the generated water vapor is adjustable. For example, the value may be 0 kp to 30 kp, for example, 5 kp, 15 kp, 30 kp, etc.

The foregoing embodiments are merely for describing the technical solutions of the present invention and not intended to limit the present invention. Although the present invention has been described in detail by the foregoing embodiments, modifications can be made to the technical solutions in the foregoing embodiments, or equivalent replacements can be made to some of the technical solutions. All the modifications or replacements will not make the essence of the corresponding technical solutions depart from the spirit and scope of the technical solutions sought to be protected by the present invention.

What is claimed is:

1. A method of simultaneously recycling plastics and detoxifying a chromite ore processing residue by residual heat of a steel slag, comprising following steps:
    (1) pouring the steel slag, which is in liquid state at 1500° C. to 1700° C. from a slag ladle into an inlet end of a wheeled feeder;
    preliminarily crushing the steel slag, and feeding the steel slag that has been crushed from an outlet end of the wheeled feeder to an inlet of a roller crusher;
    mixing the steel slag, that has been crushed, with plastics, and then pyrolyzing the plastics to obtain a plastic pyrolysis gas and a plastic pyrolysis coke;
    conveying the steel slag and the plastic pyrolysis coke to an outlet end of the roller crusher, and then cooling the steel slag by a cooling water;
    discharging the steel slag;
    (2) spraying the cooling water from step (1) onto the surface of the steel slag at the outlet end of the roller crusher, wherein the cooling water becomes a water vapor;
    controlling the water vapor to flow in a direction opposite to a flow of the steel slag wherein heat is exchanged between the water vapor and the steel slag;
    conveying the water vapor to the inlet end of the roller crusher, and then mixing the water vapor with the plastic pyrolysis gas to produce a mixed gas;
    conveying the mixed gas to the wheeled feeder, wherein heat is exchanged between the mixed gas and the steel slag, producing a mixed gas at 1000° C. to 1400° C.;
    (3) conveying the mixed gas from step (2) to a catalytic reforming furnace, wherein the catalytic reforming furnace is loaded with a calcined chromite ore processing residue;
    heating the calcined chromite ore processing residue with the mixed gas, and catalytically reforming Chromite Ore Processing Residue at 800° C. to 1200° C. to generate an energy gas;
    (4) conveying the energy gas from step (3) to a head of a rotary kiln, wherein heat is exchanged between Chromite Ore Processing Residue and the energy gas;
    continuously conveying Chromite Ore Processing Residue from a tail of the rotary kiln, and then reducing $Cr^{6+}$ in Chromite Ore Processing Residue into $Cr^{3+}$ by the energy gas;
    discharging the energy gas from the tail of the rotary kiln to a condensation device after a temperature of the energy gas is below 250° C.;
    controlling the energy gas to flow in a direction opposite to a flow of the cooling water wherein heat is indirectly exchanged;
    condensing, dehydrating and gathering the energy gas; and
    (5) discharging Chromite Ore Processing Residue from step (4) from the head of the rotary kiln into a cooling device;
    cooling Chromite Ore Processing Residue below 150° C. by the cooling water wherein a water vapor is generated;
    discharging the cooled chromite ore processing residue, and then controlling a gas pressure in the cooling device to be 0-30 kp higher than the gas pressure in atmosphere by the generated water vapor.

2. The method of claim 1, wherein a mass ratio of the cooling water for cooling the steel slag to the steel slag is 1:1-8.

3. The method of claim 1, wherein a mass ratio of the plastics to the steel slag is 1:1-8, wherein the steel slag is continuously fed.

4. The method of claim 1, wherein the mass ratio of the energy gas to Chromite Ore Processing Residue is controlled at 1-8:4.

5. The method of claim 1, wherein a mass ratio of the cooling water for cooling the steel slag to the plastics is controlled at 0.2-5:1, wherein the plastics is continuously fed.

6. The method of claim 1, wherein the calcined chromite ore processing residue loaded in the catalytic reforming furnace in step (3) can be replaced by dolomite or a $Al_2O_3$-based nano catalyst.

* * * * *